Figure 6:
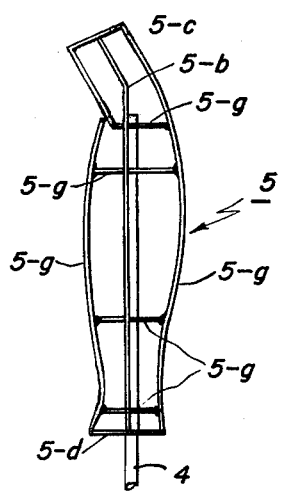

Dec. 4, 1962  M. R. DOSAL  3,066,839
APPARATUS FOR PRESSING SHIRTS
Filed Aug. 24, 1960  4 Sheets-Sheet 1
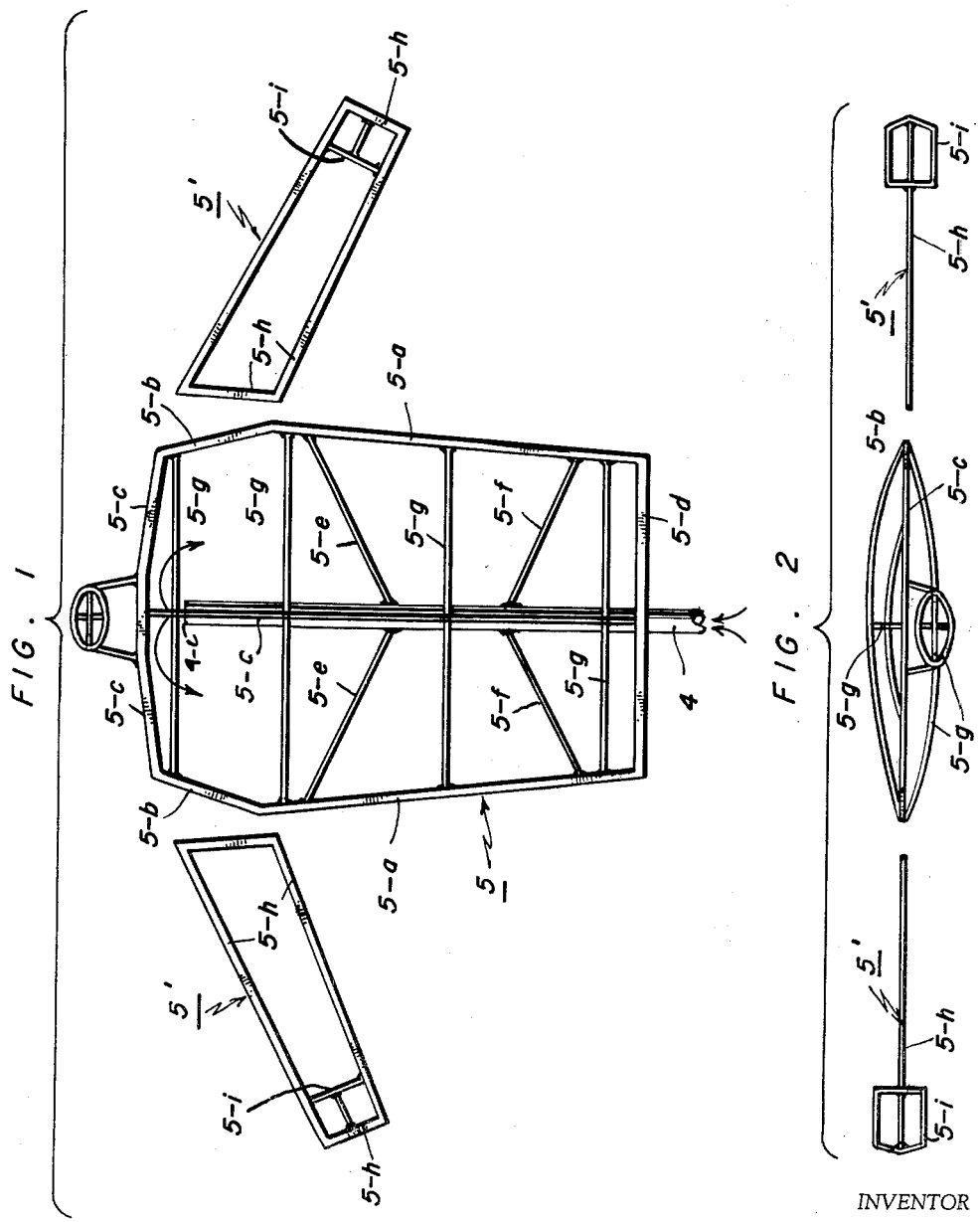
INVENTOR
MARTIN ROBERTO DOSAL
BY Ogle R. Singleton
ATTORNEY

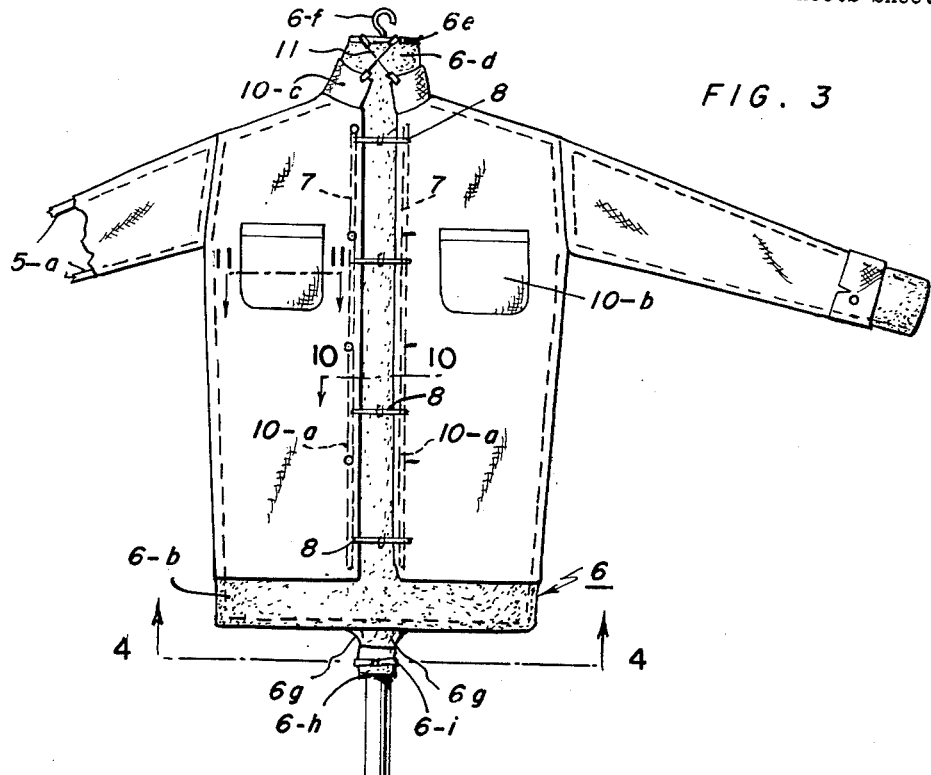
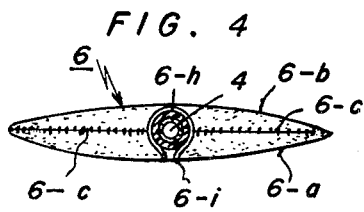
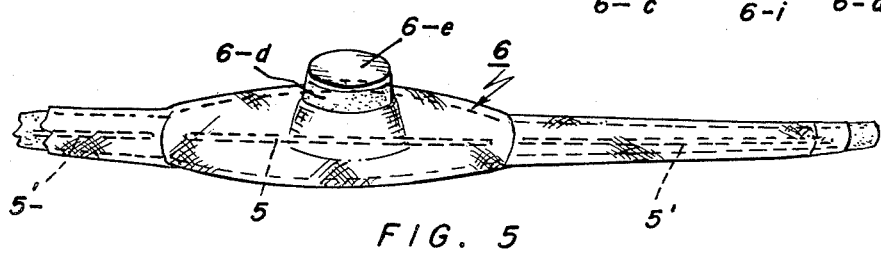

Dec. 4, 1962 M. R. DOSAL 3,066,839
APPARATUS FOR PRESSING SHIRTS
Filed Aug. 24, 1960 4 Sheets-Sheet 3

INVENTOR
MARTIN ROBERTO DOSAL

BY *Ogle P. Singleton*
ATTORNEY

Dec. 4, 1962 M. R. DOSAL 3,066,839
APPARATUS FOR PRESSING SHIRTS
Filed Aug. 24, 1960 4 Sheets-Sheet 4
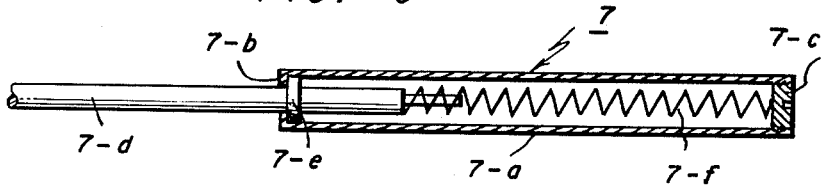
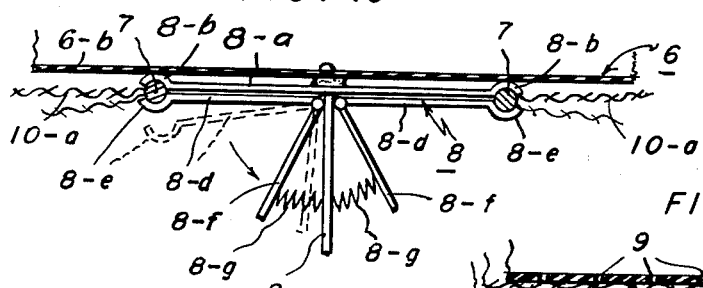
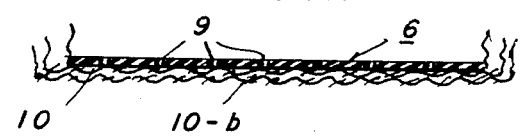
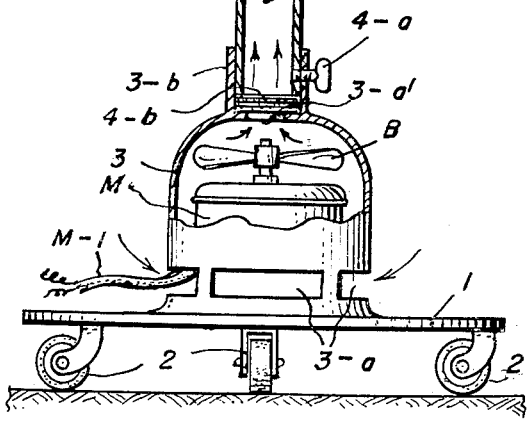
INVENTOR
MARTIN ROBERTO DOSAL
BY Ogle R. Singleton
ATTORNEY 3,066,839
APPARATUS FOR PRESSING SHIRTS
Martin R. Dosal, P.O. Box 53–62, Miami Shores, Fla.
Filed Aug. 24, 1960, Ser. No. 51,713
3 Claims. (Cl. 223—67)

My invention consists in a new and useful improvement in apparatus for pressing shirts, and is an improvement upon the apparatus disclosed and claimed in my co-pending application Serial Number 863,172, now Patent No. 3,048,310, granted August 7, 1962. There are three features of my improved apparatus herein described and claimed which I have found by experience greatly improve it over that shown in my said co-pending application, viz. (1) the form for holding the shirt is made of elastic material and is impermeable to air; (2) the frame for supporting the form is flattened and has edges which properly crease the shirt; and (3) there are means for controlling the volume of air expanding the elastic form.

(1) Since the material used for the form is elastic and impermeable to air, such as pure gum, it provides greater flexibility and for that reason will give a better setting for different types of shirts. This form may be perforated in those parts on which are placed the portions of the shirt of double thickness, such as the front folds, pockets, collar, etc., so that when the form is expanded the perforations will provide jets of air against the shirt. It is obvious that the form being elastic, when pressure of air is created inside of it, the form will expand so that the shirt is tensioned by means of clamps and adjusts around the form, and the air passing through the perforations completes the pressing of the shirt.

(2) The structure of the supporting frame is designed with the purpose of pressing the shirt without giving it a round shape. Thus it will press the shirt in a better way, giving it the proper shape so that when the work is done, the shirt will be finished as ones pressed by methods already known. As can be seen, when the form expands by the pressure of the air, it will tend to assume a round shape. The structure of the frame, fixed on an inlet tube for the air, is such as to create two creases, one on each side of the shirt. When the shirt adapts to the form on the frame, it will be given the shape of a narrow oval. Thus when the shirt is pressed, its appearance will be no different from shirts pressed by the usual methods.

(3) In my improved apparatus the degree of air pressure, produced by a motor-blower, is adjusted for each type of shirt. There are certain types of shirts which require more air because they have greater dimensions. The operator can adjust the motor to a desired position and gradually increase the amount of air required until the form adapts to the shirt which holds it. It is obvious that the greater the amount of air supplied to the form the bigger the form will become, because there is a relation between the amount of air and the size which the form will assume when expanded. The amount of air supplied by the blower can be controlled by a situable speed switch for the motor driving the blower which will regulate the r.p.m., or it can be controlled by a diaphragm to regulate the supply of air. I have tried successfully this latter method and have found that there is a much larger range with this method which permits a better pressing of the shirts. I have controlled the amount of air needed by means of suitable filters in the air inlet of the device. An electric switch usually has only three positions so that it will supply three different amounts of air. However, by opening and closing the inlet of air to the device, there can be produced more different amounts of air thereby controlling the size of the form.

While I have illustrated in the drawings and hereinafter fully describe one specific embodiment of my invention, it is to be distinctly understood that I do not consider my invention to be limited to said specific embodiment, but refer for its scope to the claims appended hereto.

Figure 7:
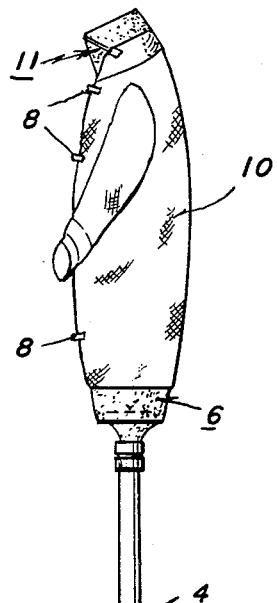
Figure 8:
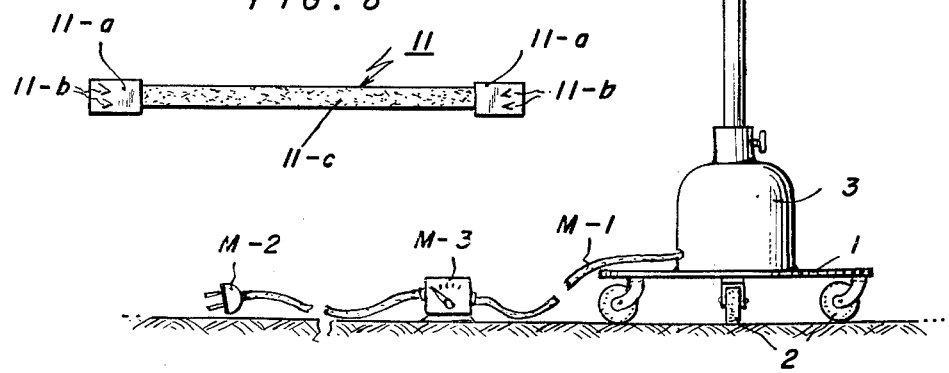

In the drawings:
FIG. 1 is a front elevation of the supporting frame.
FIG. 2 is a top plan of the supporting frame.
FIG. 3 is a front elevation of the form and a shirt mounted on the frame.
FIG. 4 is a horizontal section on the line 4—4 of FIG. 3, in the direction of the arrows.
FIG. 5 is a top plan of the form on the frame.
FIG. 6 is a side elevation of the frame.
FIG. 7 is a side elevation of the form and shirt on the frame mounted on a base.
FIG. 8 is an enlarged top plan of a holder for the shirt.
FIG. 9 is a fragmentary, enlarged side elevation, partly in section of a stiffening rod for the shirt.
FIG. 10 is an enlarged, horizontal section on the line 10—10 of FIG. 3, in the direction of the arrows.
FIG. 11 is an enlarged, horizontal section on the line 11—11 of FIG. 3, in the direction of the arrows.
FIG. 12 is a view similar to FIG. 11, the form being expanded.
FIG. 13 is an enlarged, fragmentary side elevation of the base, parts being broken away.

As shown in the drawings, my improved apparatus has a base 1 made mobile by having casters 2 (FIGS. 7 and 13) and carrying a casing 3 in which are mounted an electric motor M and a blower B driven by the motor M. The casing 3 has air inlets 3–a. The motor M has an electric lead M–1 with a suitable plug M–2, and a speed-control switch M–3 (FIG. 7).

The casing 3 has an air-outlet port 3–a' about which there is a circular socket 3–b in which is removably carried an air supply tube 4 with a lock bolt 4–a tapped through the socket 3–b (FIG. 13). Suitably disposed in the end of the tube 4 over the port 3–a there are filter plates 4–b.

Suitably mounted on the upper end of the tube 4 there is a frame 5 (FIGS. 1 and 6) configured to simulate the torso and neck of a wearer of a shirt, composed of a series of rigid rods 5–a, 5–b, 5–c and 5–d. A pair of rods 5–a form the sides of the torso. A pair of rods 5–b and a pair of rods 5–c form the shoulders of the torso, and a rod 5–d forms the bottom of the torso. The rods 5–a, 5–b, 5–c and 5–d form the perimeter of the frame 5 and are of suitable material and form to cause the form and shirt mounted on the form to become creased by the rods when the form is expanded. A pair of rods 5–e connect the uper ends of the rods 5–a with the tube 4, and a pair of rods 5–f connect the lower ends of the rods 5–a with the tube 4. I provide wires 5–g (FIGS. 2 and 6) to give shape to the form when mounted on the frame 5.

The above-described elements of the frame 5 serve to crease the portions of the shirt covering the torso and neck.

I provide supplemental frames 5' (FIG. 1) for creasing the sleeves of the shirt. These frames 5', independent of the frame 5, comprise creasing rods 5–h suitably configured to form the perimeter of each frame 5', which has at its outer end suitably configured wires 5–i to expand the outer ends of the sleeve portions of the form and shirt. The frames 5' are independent of the frame 5 to facilitate mounting the form on the frame and the shirt on the form.

The form 6 of elastic material impermeable to air (FIGS. 3, 4, 5, 7, 10, 11 and 12) is suitably dimensioned and configured to simulate the torso, neck and arms of a wearer of a shirt, and comprises a back portion 6–a and front portion 6–b (FIG. 4) connected at their bottoms by zippers 6–c. The form 6 has a neck portion 6–d with a closure 6–e having a hanger hook 6–f. The form 6 has, at its bottom, tails 6–g which are gathered about a rubber gasket 6–h on the tube 4 and clamped thereon by a ring 6–i to effect an air-tight seal between the form 6 and the tube 4.

It will be noted that the discharge end 4–c of the tube 4 (FIG. 1) is so disposed as to be in the form 6 when the form 6 is mounted on the frame 5.

I provide a pair of extensible rods 7 (FIG. 9), each of which has a hollow portion 7–a with an inner peripheral 7–b at one end and a closure cap 7–c threaded in the other end, and a solid portion 7–d slidable through the collar 7–b with a stop collar 7–e on its inner end, and biased outwardly by a coil spring 7–f confined between the cap 7–c and the end of the portion 7–d.

The use of these rods 7 will be presently explained.

Suitably mounted on the front portion 6–b of the form 6 (FIG. 3) there are a plurality of clips 8 (FIG. 10) for holding the rods in proper position. Each clip 8 has a bar 8–a with a semicircular socket 8–b on each end and a transverse bar 8–c projecting forwardly its middle. A pair of rods 8–d are pivoted to the bar 8–A on the sides of the bar 8–c, respectively, and have on their outer ends semi-circular sockets 8–e, co-acting with the sockets 8–b, respectively. Each rod 8–d has an operating lever 8–f biased by an expansion spring 8–g confined between the lever 8–f and the bar 8–c to effect clamping engagement of the sockets 8–e.

The use of these clips 8 will be presently explained.

The form 6 has a plurality of perforations 9 (FIGS. 11 and 12) suitably disposed in the portions of the form 6 on which are disposed the thickened portions of the shirt 10, such as the front folds 10–a, pockets 10–b and collar 10–c.

I provide holders 11 (FIGS. 3 and 8), each comprising a pair of plates 11–a with hooks 11–b, connected by an elastic band 11–c.

The use of these holders 11 will be presently explained.

Having described the details of construction of my apparatus, I will now describe its use and operation.

The frame 5 being mounted on the tube 4 on the base 1, the form 6 is placed about the frame 5, zippers 6–c are closed, and ring 6–i is clamped about the tails 6–g on the gasket 6–h. The arm portions of the form 6 are so fitted about the frames 5' as to bring the frames 5' against the frame 5 (FIG. 3), the wires 5–h in the outer ends of the frames 5' expanding the closed ends of the arm portions of the form 6.

The shirt 10 is placed upon the form 6. The rods 7 having been placed in the front folds 10–a of the shirt 10, the clips 8 are so attached to the folds 10–a as to grip the rods 7 therein, drawing the shirt 10 tightly about the form 6, the holders 11 attaching collar 10–c to neck portion 6–d of form 6.

When the motor M is then energized, it causes the blower B to supply air through the tube 4 into the form 6 thereby expanding the elastic form 6 to press the shirt mounted thereon.

It is obvious that the degree of air pressure required to properly expand the form 6 according to the size of the particular shirt being pressed can be determined either by the speed-switch M–3 of the motor M or by the use of proper filter plates 4–b in the tube 4.

It will be seen that when the form 6 is expanded as above described to properly press against the shirt 10 mounted thereon, the air then escapes from the form 6 through the distended perforations 9 in the form 6 against the thickened portions 10–a, 10–b and 10–c of the shirt 10, serving to evaporate the moisture from said portions. If desired, the form 6 may be provided with additional perforations so that air jets impinge upon other portions of shirt 10.

It is to be understood that, if desired, heating elements such as disclosed in my said co-pending aplication may be mounted in the frame 5 so as to be spaced from the form 6 thereon. Such elements expedite the evaporation of moisture in shirt 10.

It is obvious that the expanded form 6 will cause the shirt 10 mounted thereon to be creased by the rigid, peripheral rods 5–a, 5–b, 5–c and 5–d of the frame 5 and the rods 5–g of the frames 5', thus as above stated giving the shirt the shape of a narrow oval (FIG. 4).

If it be desired that the shirt 10 be starched, this can be done by spraying the dampened shirt 10 on the form 6 with any suitable sprayable starch.

Having described my invention, what I claim is:

1. In an apparatus for pressing a shirt, the combination of a frame configured to simulate the torso and neck of a wearer of the shirt, said frame having a set of rigid rods forming two sides, the top and the bottom of said frame, and a set of wires mounted on said rods and configured to give an oval shape to said frame; a tube on which said frame is mounted; an expansible form mounted on said frame; means adapted to supply air under pressure through said tube and said frame, to expand said form; and means adapted to confine the shirt about said form, the frame, form and shirt being so related that, when said form is expanded, said form presses the shirt into an oval shape, and said rods forming the sides of said frame crease the sides of said form and the shirt thereon.

2. An apparatus, according to claim 1, in which said expanding means is so adjustable as to expand said form to that degree which dimensions said form relative the dimensions of the particular shirt to be pressed.

3. An apparatus, according to claim 1, in which said expansible form has arm portions for receiving thereover the sleeves of the shirt, and which has a pair of independent frames inserted in said arm portions, respectively, said independent frames having a plurality of peripheral, rectilinear, rigid rods adapted, when said arm portions are expanded, to crease said arm portions and the sleeves of the shirt thereover.

References Cited in the file of this patent

UNITED STATES PATENTS

| | | |
|---|---|---|
| 1,253,608 | Lambert | Jan. 15, 1918 |
| 1,293,826 | Lungstras | Feb. 11, 1919 |
| 1,659,097 | Gygi | Feb. 14, 1928 |
| 2,410,485 | Du Nah | Nov. 5, 1946 |
| 2,417,838 | Paris | Mar. 25, 1947 |
| 2,679,956 | Richterkessing | June 1, 1954 |
| 2,698,705 | Hitz | Jan. 4, 1955 |
| 2,740,029 | Kueser et al. | Mar. 27, 1956 |
| 2,803,386 | Brown | Aug. 20, 1957 |

FOREIGN PATENTS

| | | |
|---|---|---|
| 1,108,303 | France | Aug. 24, 1955 |